United States Patent
Gschwind et al.

(10) Patent No.: US 9,504,277 B2
(45) Date of Patent: Nov. 29, 2016

(54) MIST DISTRIBUTION HEAD FOR A NEBULIZING APPARATUS

(71) Applicant: ARECO FINANCES ET TECHNOLOGIE-ARFITEC, Grasse (FR)

(72) Inventors: Michel Gschwind, Grasse (FR); Frédéric Richard, Golfe Juan (FR)

(73) Assignee: ARECO FINANCES ET TECHNOLOGIE—ARFITEC, Grasse (FR)

( * ) Notice: Subject to any disclaimer, the term of this patent is extended or adjusted under 35 U.S.C. 154(b) by 107 days.

(21) Appl. No.: 14/428,950

(22) PCT Filed: Sep. 18, 2013

(86) PCT No.: PCT/FR2013/052155
§ 371 (c)(1),
(2) Date: Mar. 17, 2015

(87) PCT Pub. No.: WO2014/044971
PCT Pub. Date: Mar. 27, 2014

(65) Prior Publication Data
US 2015/0223513 A1    Aug. 13, 2015

(30) Foreign Application Priority Data

Sep. 19, 2012    (FR) .................................. 12 58806

(51) Int. Cl.
| | |
|---|---|
| *B01F 3/04* | (2006.01) |
| *A23L 3/3589* | (2006.01) |
| *A47F 3/00* | (2006.01) |
| *A47F 3/04* | (2006.01) |
| *B05B 1/14* | (2006.01) |

(Continued)

(52) U.S. Cl.
CPC .............. *A23L 3/3589* (2013.01); *A47F 3/001* (2013.01); *A47F 3/0495* (2013.01);
(Continued)

(58) Field of Classification Search
CPC .. B01F 3/04; B01F 3/04007; B01F 3/04014; B01F 3/04021; B01F 3/0407
USPC .................................................. 261/78.2, 81
See application file for complete search history.

(56) References Cited

U.S. PATENT DOCUMENTS

| | | | |
|---|---|---|---|
| 1,951,587 | A | 3/1934 | Tyler |
| 2,041,399 | A | 5/1936 | De Graaf |

(Continued)

FOREIGN PATENT DOCUMENTS

| | | |
|---|---|---|
| FR | 2788706 A1 | 7/2000 |
| FR | 2971954 A1 | 8/2012 |

(Continued)

OTHER PUBLICATIONS

Jan. 2, 2014 International Search Report issued in International Application No. PCT/FR2013/052155.

(Continued)

*Primary Examiner* — Robert A Hopkins
(74) *Attorney, Agent, or Firm* — Oliff PLC

(57) ABSTRACT

A fog distribution head for a fogging apparatus, which has: a fog inlet, and at least two fog outlets, each suitable for placing the inlet in communication with the outside of the head. The head includes at least two plugs suitable for plugging the respective outlets. Each plug is suitable for plugging a single one of the outlets, the plugs being movably mounted with respect to a frame of the head, independently from one another.

10 Claims, 7 Drawing Sheets

(51) Int. Cl.
*B05B 1/26* (2006.01)
*B05B 1/32* (2006.01)
*B05B 7/00* (2006.01)
*A23B 7/158* (2006.01)
*B05B 17/06* (2006.01)

(52) U.S. Cl.
CPC ............ *B01F 3/04021* (2013.01); *B05B 1/14* (2013.01); *B05B 1/265* (2013.01); *B05B 1/267* (2013.01); *B05B 1/326* (2013.01); *B05B 7/0012* (2013.01); *A23B 7/158* (2013.01); *B05B 17/0607* (2013.01)

(56) References Cited

U.S. PATENT DOCUMENTS

| | | |
|---|---|---|
| 2,077,725 A | 4/1937 | Tyler |
| 2,090,326 A | 8/1937 | Glattke |
| 4,114,813 A | 9/1978 | Suga |
| 5,193,354 A | 3/1993 | Kleinberger et al. |
| 5,350,117 A | 9/1994 | Kleinberger et al. |
| 7,213,773 B1 * | 5/2007 | Rappin ............ B05B 7/0869 239/310 |
| 2012/0067974 A1 | 3/2012 | Davranche et al. |

FOREIGN PATENT DOCUMENTS

| | | |
|---|---|---|
| WO | 2010106276 A1 | 9/2010 |
| WO | 2013034847 A1 | 3/2013 |
| WO | 2013060970 A1 | 5/2013 |

OTHER PUBLICATIONS

Jan. 2, 2014 Written Opinion of the International Searching Authority issued in International Application No. PCT/FR2013/052155.

\* cited by examiner

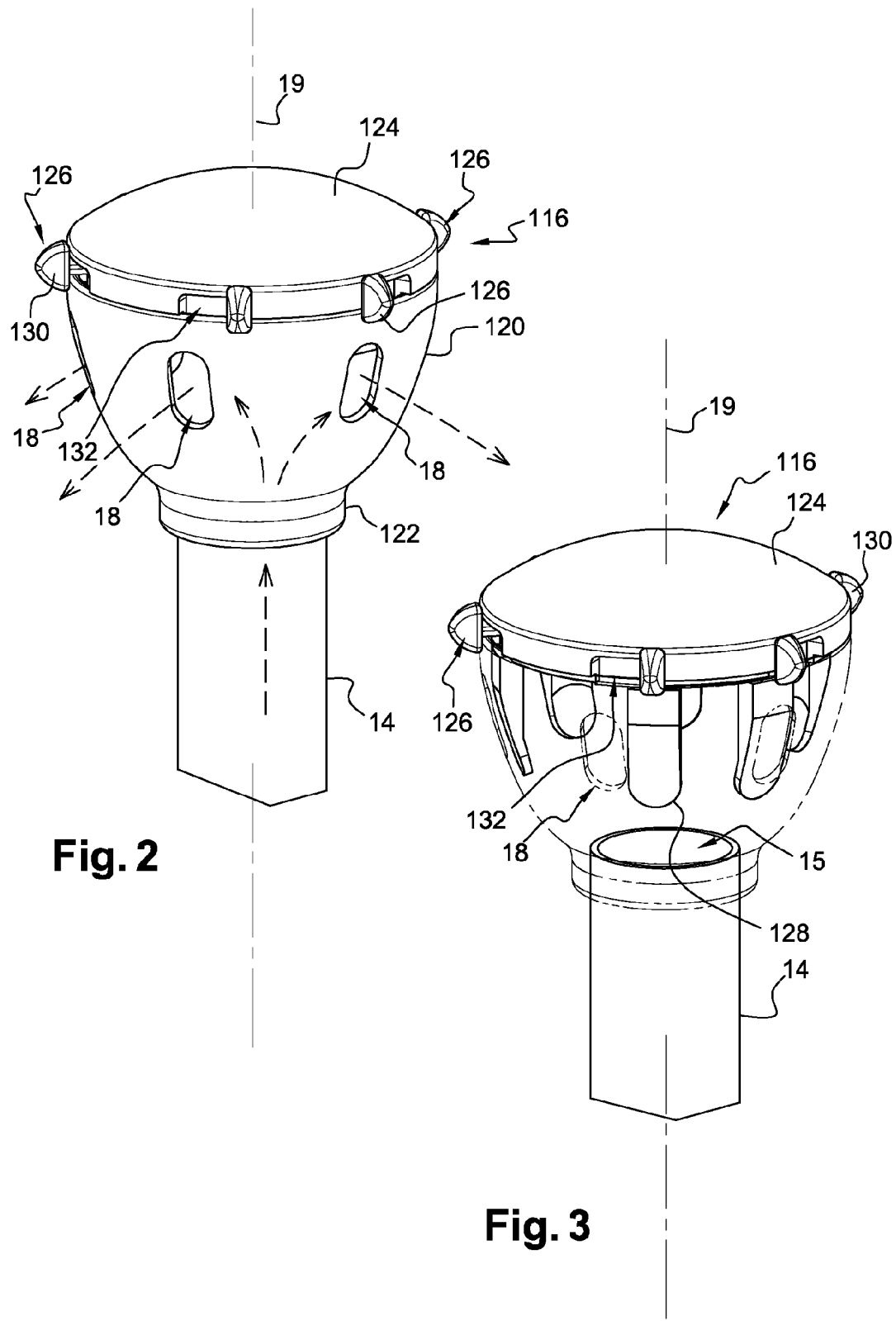

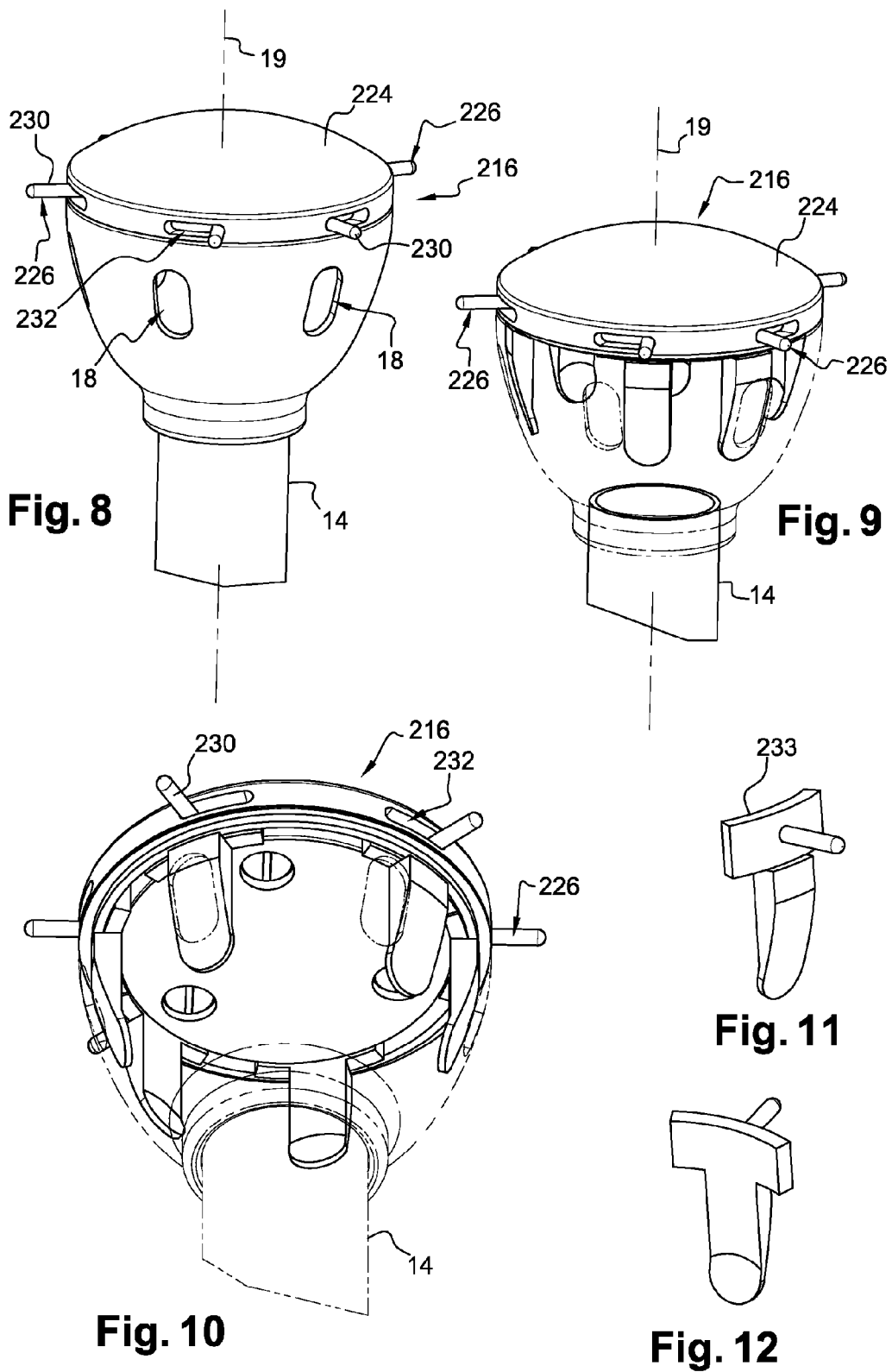

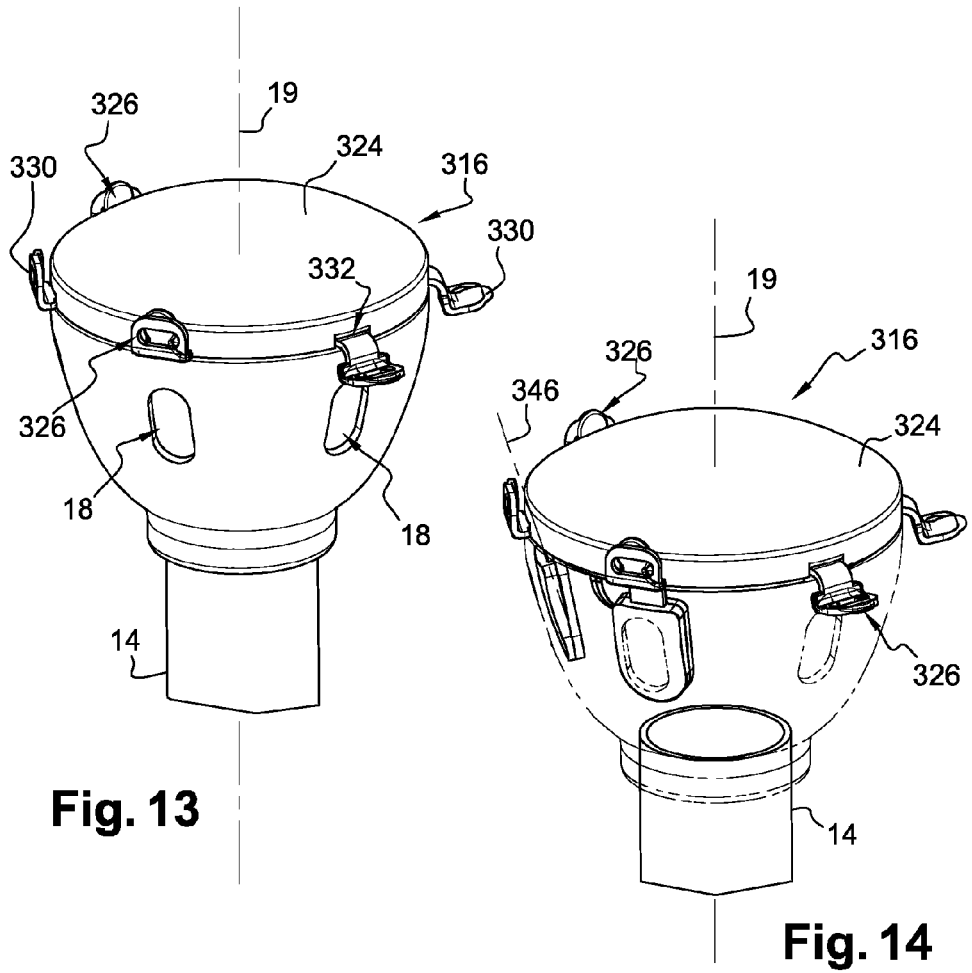
Fig. 13
Fig. 14
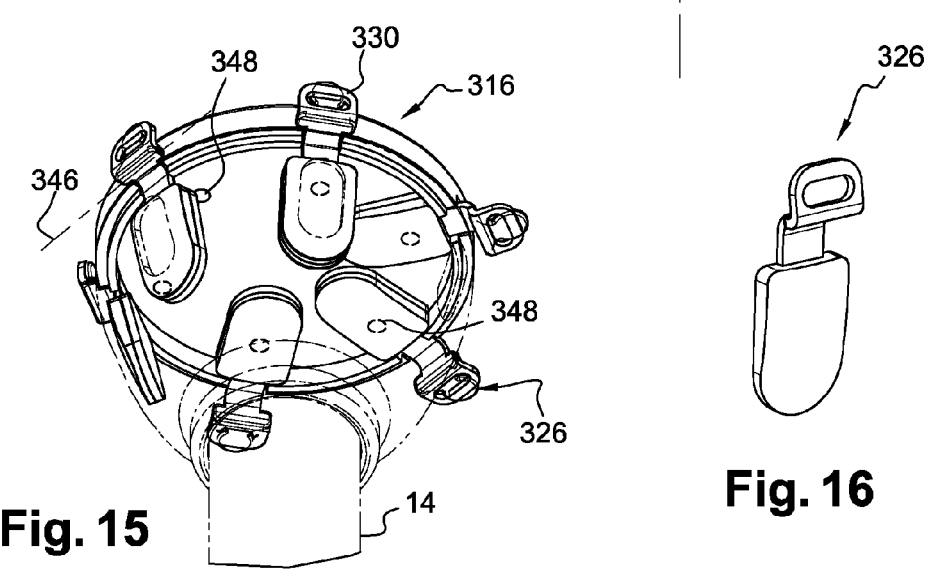
Fig. 15
Fig. 16

MIST DISTRIBUTION HEAD FOR A NEBULIZING APPARATUS

The invention relates to installations for diffusing a mist of nebulized water droplets onto products.

Such an installation, associated for example with a food product exhibition display used in a place of sale, is known from the document WO-2010/106276 in the name of the applicant. The installation comprises diffusers which project the mist over the products. It preserves the freshness of the products, enhances their appearance on the display stand and promotes their sale.

The installation notably comprises a mast with a stopper at its top end. The stopper has internal pipes coinciding with orifices of the mast in order to connect them with the bottom part of the mast and thus allow the outward diffusion of the mist of droplets originating from the bottom part of the mast. If the stopper is turned, the coincidence is eliminated such that the orifices are blocked and the diffusion is stopped.

Despite its many advantages, such a stopper offers little flexibility in adjusting the diffusion of the mist onto the products. Furthermore, it is relatively costly to produce because of its bulky nature.

One aim of the invention is to adjust the diffusion of the mist onto the products in a more flexible manner and reduce the cost of the installation.

To this end, there is provided, according to the invention, a mist diffusion head for a nebulizing installation, which exhibits a mist inlet orifice, and at least two mist outlet orifices each suitable for connecting the inlet orifice with the outside of the head, the head comprising at least two shutters suitable for blocking the respective outlet orifices, each shutter being able to block just one of the outlet orifices, the shutters being mounted to move relative to a frame of the head independently of one another.

Thus, each of the orifices can be blocked or opened independently of the other(s). The choice of the number of open orifices makes it possible to adjust the quantity of mist diffused onto the products. Also, the possibility of opening one orifice rather than another makes it possible to orient the diffusion of the mist in the desired direction, for example toward certain products and not toward others. This adjustment can be easily modified at any time by blocking some of the orifices and by opening others. The head according to the invention therefore offers great flexibility in adjusting the intensity of the mist flow or flows and their orientation.

The head according to the invention will also be able to exhibit at least any one of the following features:

the shutters are mounted to rotate relative to the frame;

each shutter exhibits a vertical axis of rotation;

each shutter exhibits a horizontal axis of rotation;

the shutters have the same axis of rotation; and the shutters are mounted to slide relative to the frame, notably in a direction parallel to a main axis of the head.

Advantageously, the head is arranged such that each shutter tends by gravity to occupy a predetermined single position out of an orifice blocking position and an orifice opening position, preferably the blocking position.

The control and use of the head are thus simplified. It is in fact sufficient for the operator to place the shutter in the vicinity of the predetermined position for it to reach said position and stably remain there.

In one embodiment, the head comprises magnets suitable for retaining the respective shutters in a predetermined position, preferably a position of opening of the orifice by the shutter.

The magnets form a simple and non-mechanical means for retaining the shutters in the predetermined position.

Advantageously, each shutter extends inside the head and comprises an operating member extending outside the head.

The operator can therefore act directly on the shutter to place it in the desired position, and do so without having to open the head.

Preferably, each shutter passes through an orifice of a cover of the head.

Forming additional openings in the main wall of the head is thus avoided.

Provision can be made for the head to comprise two walls defining the orifices, extending one against the other, between which the shutters are interposed and configured to guide the shutters.

Provision can also be made for the head to comprise an internal dispenser distinct from the frame and suitable for connecting the inlet orifice with the outlet orifices.

Since it is distinct from the frame, this dispenser can easily be removed to be cleaned. Furthermore, since the dispenser can be a part that is hidden from view, its constituent material can be chosen freely, notably without constraint associated with the appearance of this material.

Advantageously, there are at least three outlet orifices.

Preferably, the outlet orifices are external orifices.

There is also provided, according to the invention, an installation for diffusing a mist of droplets which comprises at least one head according to the invention.

There is also provided, according to the invention, a method for diffusing a mist of droplets onto products, in which at least one head according to the invention and/or at least one installation according to the invention are/is used.

There follows a description of a number of embodiments of the invention by way of nonlimiting examples, and with reference to the attached drawings in which:

FIGS. 2 to 4 are perspective views of the head of the installation of FIG. 1;

FIGS. 8 to 12 are views similar to FIGS. 2 to 6, illustrating a head according to a second embodiment of the invention;

FIGS. 13 to 16 are views similar to FIGS. 2 to 6 illustrating a head according to a third embodiment of the invention;

DESCRIPTION OF THE INVENTION

Figure 1:
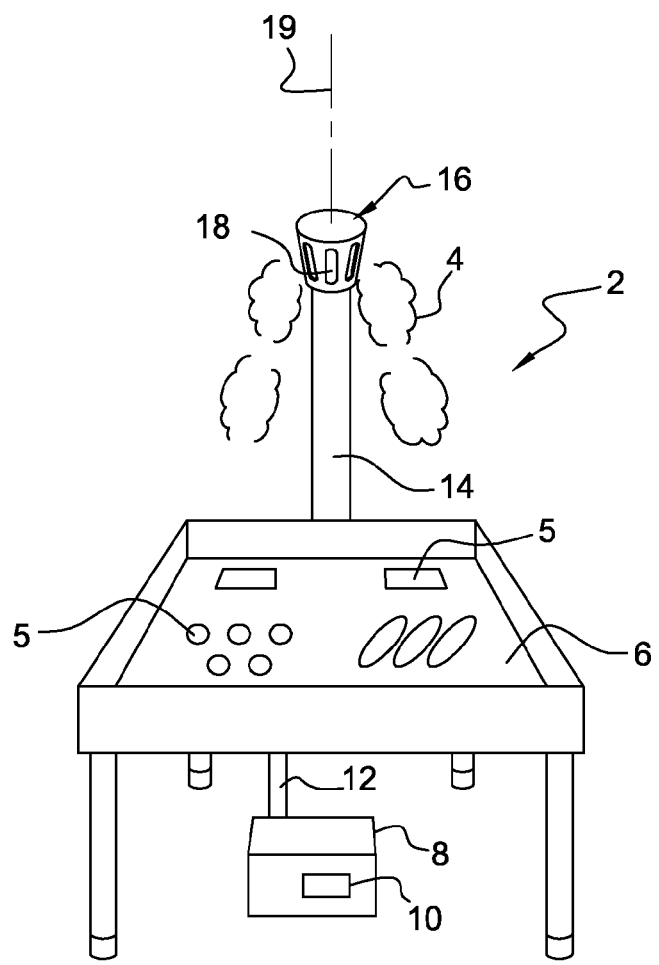
FIG. 1 is an overview of an installation according to a first embodiment of the invention.
Figure 4:
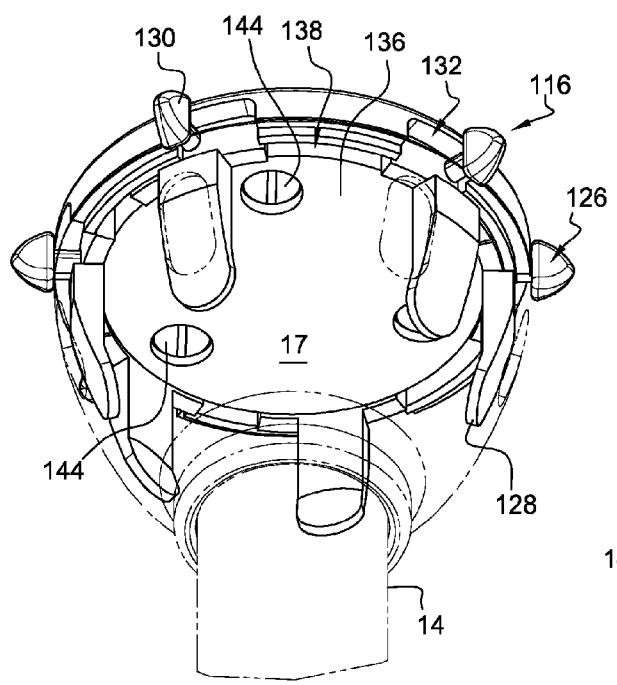
Figure 5:
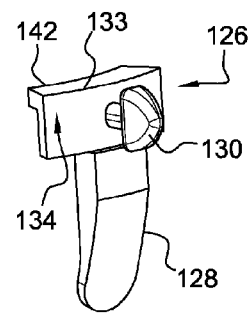
FIGS. 5 and 6 are perspective views of one of the shutters of the head of FIG. 2.
Figure 6:
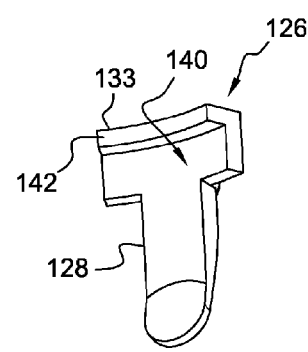
Figure 7:
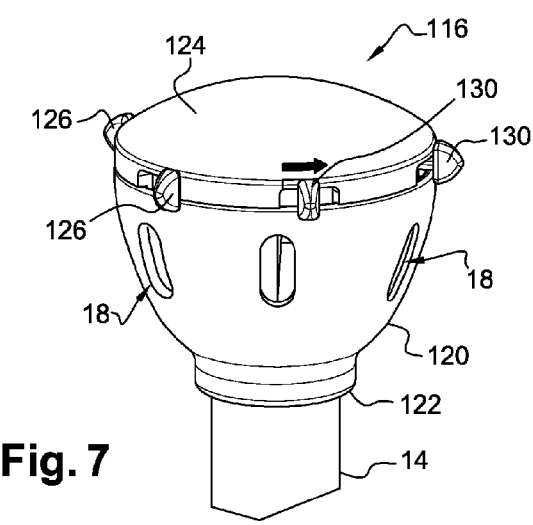
FIG. 7 is a view similar to FIG. 2 shows an intermediate position of opening of the orifices.

FIG. 1 illustrates a food product presentation installation 2. Here, it is a piece of furniture in this case forming a table. In the present example, this piece of furniture is used in a place selling products.

The products are for example fresh products 5 such as fruit and vegetables. The installation can also be used for other fresh food products such as meat or fish. It is also applicable to food products such as cheese and, more generally, to any product sensitive to drying, such as flowers.

The piece of furniture here forms a display stand and comprises, in the top part, a planar rectangular display 6. The display stand comprises a bottom wall and is open in the top part such that the products can be observed or taken by the public passing alongside the display stand.

The piece of furniture comprises means for diffusing a mist of nebulized water droplets, over the products and onto the latter in order to preserve their freshness. These means comprise a vertical mast 14 of axis 19 and an equipment item 8 making it possible to generate the mist of water droplets and route it to the mast. This equipment item notably comprises an electrical power supply unit which supplies current to a mist generator. The latter comprises one or more ultrasound emitters equipped, for example, with an acoustic concentration nozzle used to produce the mist formed by the nebulized water droplets in suspension in a flow of air. The generator is fed with water by a suitable means. Such a generator is known in itself notably from the document FR-2 788 706. The installation comprises pipes 12 by means of which the mist produced by the generator or generators is transmitted to the mast, to a bottom axial end thereof. The assembly is provided with a control unit which is not illustrated and that makes it possible to control and adjust the operation of the piece of furniture. The unit notably makes it possible to adjust the ventilation speed, that is to say the speed of the air forming a part of the mist, the nebulizing power and other machine parameters (cycle, safety threshold, etc.).

The installation comprises a head 16 situated at the top of the mast and ensuring the diffusion of the mist toward the products, the head being situated higher than the latter.

For the simplicity of the description, the installation here comprises a single mast 14 bearing a single head 16. It is however understood that such an installation can comprise a plurality of masts each bearing a diffusion head.

There now follows a description of several embodiments of the head 16. In these different embodiments, similar elements have numerical references increased by 100.

First Embodiment

A first embodiment of the head 116 is illustrated in FIGS. 2 to 7.

The head is generally shaped with symmetry of revolution about the axis 19. It comprises a body 120, in this case formed by a bolus, the wall of which is, in cross section in a plane radial to the axis 19, in the form of a circular arc, the center of curvature of which is located inside the bolus. The bolus is flared and curved, its diameter widening from the base of the bolus to its top edge. Here, this form divides by six the speed of the mist between its inlet and its outlet from the head, by creating an expansion of the mist, and makes it possible to downwardly orient the orifices 18 of the bolus presented below.

The bolus 120 has, at its bottom end, a flange 122 by which it is threaded onto the top end of the mast with the head coaxial to the mast. This flange delimits a bottom mist inlet orifice 15 in the head for the mist from the mast.

The bolus 120 has a top circular opening extending in a plane at right angles to the axis 19 and blocked in a seal-tight manner by a removable cover 124 having a flange fitted into the opening of the bolus.

The bolus has external mist outlet orifices 18 passing right through its wall from the outside to the inside of the bolus. Here, there are six of these orifices, but this number can be varied and can, for example, be equal to two, three, four or five or even more than six. The orifices are, in this case, identical to one another and evenly distributed around the axis 19 by being the image of one another by a rotation of the axis 19. Each orifice is here oblong, slotted, stretching vertically in a direction contained in a plane radial to the axis 19. The axis of each orifice is inclined relative to the vertical and horizontal directions. The bolus delimits an internal cavity 17 of the head. Each orifice 18 connects the inlet orifice 15 with the outside of the head via the common cavity 17, and does so independently of the other orifices 18.

The head 116 comprises shutters 126 associated with the respective outlet orifices 18 and equal in number thereto. The shutters are suitable for blocking the respective outlet orifices, each shutter being suitable for blocking just one of the outlet orifices. The shutters are identical to one another. They are mounted to move relative to the bolus independently of one another. In this case, the shutters are mounted to rotate relative to the bolus around the same vertical axis formed by the axis 19.

Each shutter 126 comprises a stopper 128 extending inside the head and an operating knob 130 extending outside the head.

The cover has a bottom flange having external and internal cylindrical faces with circular section in a plane at right angles to the axis 19. In this flange, circumferential radial through-openings 132 are formed, in the same number as the shutters, and respectively receiving the latter. The openings 132 are opened downward at the bottom edge of the cover coming into contact with the upper edge of the bolus and each have a general rectangular form.

Each shutter extends through one of the openings, the area of join between the stopper and the knob extending into the opening. The area of join also comprises an internal guiding portion 133 having a cylindrical external face 134 with circular section in a plane at right angles to the axis 19 and of the same radius as the internal face of the flange of the cover so as to produce a surface contact therewith. The knob 130, moreover, comes to bear by its internal face against the external face of the flange.

The cover 124 comprises a disk-shaped internal wall 136, extending facing the external wall of the cover and rigidly fixed thereto by conventional means allowing it to be removed, for example screws 144 extending into orifices of the internal wall and engaged with corresponding threads of the main external wall of the cover. The orifices of the wall 136 have a shoulder onto which the head of each screw comes to bear. The internal wall 136 has a cylindrical circumferential face 138 of circular section in a plane at right angles to the axis 19 which is suitable for producing a surface contact with an internal face 140 of the same form of the guiding portion 133. These cooperations ensure the rotational guidance of each shutter relative to the cover about the axis 19.

The portion 133 and the knob 130 each have a height in the direction of the axis that is greater than that of the opening 132. Similarly, the portion 133 has a length in the circumferential direction about the axis that is greater than that of the opening. Furthermore, the guiding portion 133 has a top flange 142 coming to bear against an internal top face of the wall 136. By virtue of this arrangement, the shutters are kept captive in the openings 132, even when the cover is separated from the bolus.

Each knob 128 has an external face in surface contact with the internal face of the bolus and suitable for blocking all of the associated orifice 18. This is the blocking position occupied by the shutter when it is in abutment against one of the circumferential ends of the opening 132. For the shutters that can be seen on the front face of the head in FIG. 3, this is the left end of the opening 132. Conversely, when the shutter is in abutment against the other circumferential end of the opening, the stopper leaves the orifice 18 entirely free. The shutter is then in the open position, at the right end of the opening in FIG. 3.

The installation operates as follows. The mist generator produces a mist of nebulized water droplets in suspension in a flow of air which is routed from bottom to top in the mast 14 to the inlet orifice 15 then enters into the cavity 17 of the head as indicated by the dotted line arrows of FIG. 2. The mist then leaves the head through only those outlet orifices 18 whose shutters are in the open position. The mist does not leave through the outlet orifices whose shutters are in the blocked position. Knowing that the orifices are distributed all around the head, it is thus possible to select the desired direction or directions in which the mist is to be diffused and therefore the area or areas of the display intended to receive the mist. At any time, one of the knobs 130 can be operated to place the shutter in the open or closed position, and this can be done independently of the other shutters. It is also possible to place all the shutters in the open position in order for the mist to be diffused at the same time through all the outlet orifices 18. Conversely, all the outlet orifices can be blocked with the shutters to prevent any diffusion of the mist through the head, and for example reserve this diffusion for another head of the same installation.

As illustrated in FIG. 7, it is also possible to place at least any one of the shutters 126 in an intermediate position of opening of the associated orifice. In this case, this intermediate position can be any position between the fully open position and the fully closed position. The shutter is retained there by friction. In such an intermediate open position, the flow rate of the mist through the orifice is overall proportional to the section of the orifice which is thus left free by the shutter. The knobs 130, which have a flattened form in a vertical plane radial to the axis 19, are particularly easy to manipulate.

By virtue of the shape given to the bolus and to the shutters, if condensation occurs inside the head, notably on the shutters, no drop of water flows out of the head. The flow takes place entirely within the head and inside the mast.

Second Embodiment

There now follows a description, with reference to FIGS. 8 to 12, of a second embodiment of the head 216 of the installation of FIG. 1. The head 216 is similar to that of the first embodiment. It differs therefrom by the shape of the openings 232 which, here, is not rectangular but oblong. Furthermore, these openings 232 are this time closed on the side of the bottom edge of the cover. The knob 230 of each shutter 226 is this time in the form of a rectilinear rod extending in a direction radial to the axis 19. This rod extends through the opening 232 to constitute the part of the shutter which is housed therein. The guiding portion 233 of the shutter has no flange. Therefore, this time, it is the rod 230 received in the opening 232 which keeps the shutter captive in the cover. The other features of the head are identical to those of the first embodiment. The operation of the installation is unchanged.

Third Embodiment

There now follows a description with reference to FIGS. 13 to 16 of a third embodiment of the head of the installation of FIG. 1. It differs from that of the first embodiment by the following features.

This time, the axis of rotation 346 of each shutter 326 is horizontal and locally parallel to the direction tangential to the flange of the cover. The axes of rotation 346 of the shutters are not therefore parallel to one another but all extend in one and the same plane at right angles to the axis 19.

In these conditions, whereas in the previous two embodiments the stoppers remained in contact with the internal face of the bolus regardless of their position, this time the stoppers are in contact with this face only in the blocking position. The stoppers are separated from the face in the open position. In this case, each stopper in the open position extends facing the cover and even in contact therewith. The internal wall of the cover is, this time, absent.

The holding of the stoppers in the open position is ensured by magnets 348 of which, here, there are as many as there are shutters. The magnets 348 are in this case rigidly fixed to a bottom face of the cover. Each shutter comprises at least one part made of magnetic material suitable for cooperating magnetically with the magnet.

Each shutter is arranged such that it tends by gravity to occupy just one position out of the blocking position and the open position of the orifice. Here, it is the blocking position which is therefore a stable position. If necessary, a counterweight can be added to each shutter to obtain this effect, if it is not already obtained by the weight distribution of the shutter given the position of its axis of rotation.

Each magnet is chosen such that it is not sufficient in itself to displace the shutter from the bottom blocking position to the top open position. On the other hand, it is chosen such that it is able to keep the shutter in the latter position when the operator places it there by actuating the knob 330 or places it is an adjacent position. The knob this time has a form that is flattened in a direction radial to the axis 19 when the shutter occupies the blocking position.

Each shutter can be produced entirely in a metallic material suitable for cooperating with the magnet. Otherwise, it is possible to produce a part of the shutter in a non-magnetic metallic material or even in a plastic material, and another part of the shutter, comprising the knob, in a metallic material suitable for cooperating with the magnet.

The operation of the installation is identical to that of the preceding embodiments, each shutter making it possible, at will, to open or close the associated outlet orifice 18.

To remove the cover from the bolus, all the shutters are placed in the open position such that they are retained magnetically against the cover and are thus rigidly fixed thereto.

In each of these embodiments, the bolus and the cover can be made of a plastic material or of metal, for example stainless steel, possibly non-magnetic.

Fourth Embodiment

A fourth embodiment of the head 416 is illustrated in FIGS. 17 to 23. It is identical to the first embodiment except for the following.

The body this time comprises a cylindrical external wall 420, the generatrices of the cylinder being based on a half-circle. The axis 19 of the cylinder is vertical and forms the main axis of the head.

The body has, at its bottom end, an end fitting 422 by which it is threaded coaxially onto the top end of the mast 14. This flange delimits the inlet orifice 15. The body comprises a planar bottom wall 423 at right angles to the axis 19 and contiguous to the top edge of the end fitting 422 in line with which it presents an orifice. It also comprises a rectangular planar rear wall 425 parallel to the axis 19, contiguous to the rear edge of the bottom 423 and in contact by its longitudinal ends with the internal face of the wall 420.

Figure 19:
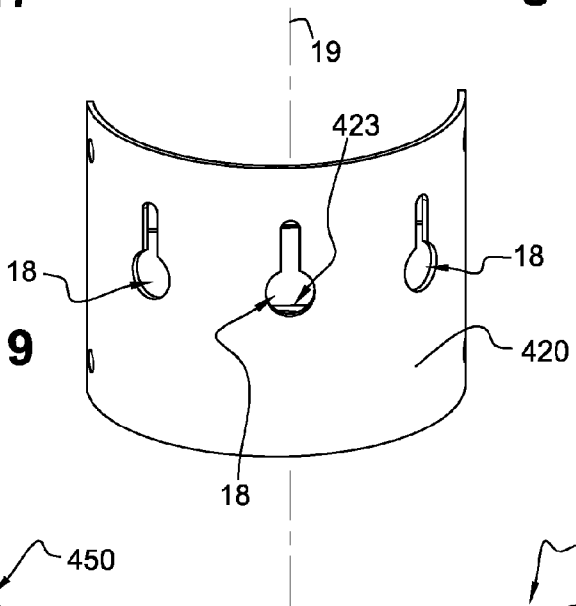
FIGS. 19 to 22 are perspective views of different parts of the head of FIG. 18.
Figures 20, 21:
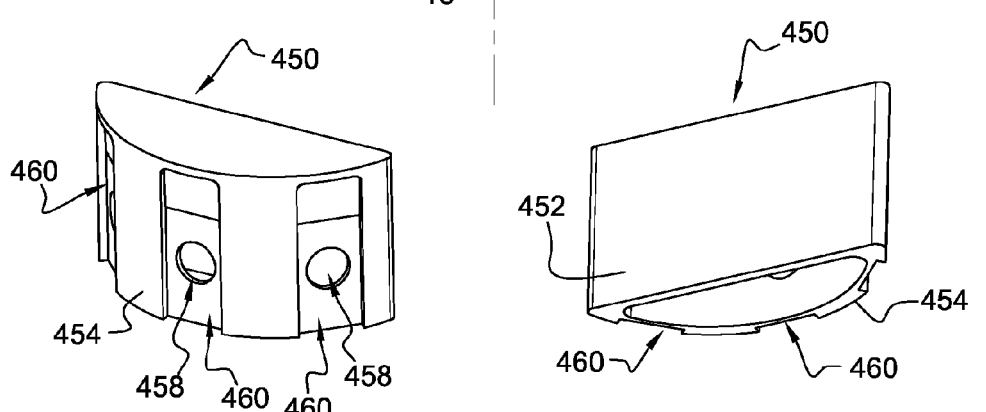

As illustrated notably in FIG. 19, the body has external mist outlet orifices 18 passing through the wall 420. Here, there are three of these orifices. Each orifice this time has a circular form extended by an oblong section stretching vertically upward. Each orifice 18 connects the inlet orifice 15 with the outside of the head via the common cavity 17, and does so independently of the other orifices 18.

Figure 22:
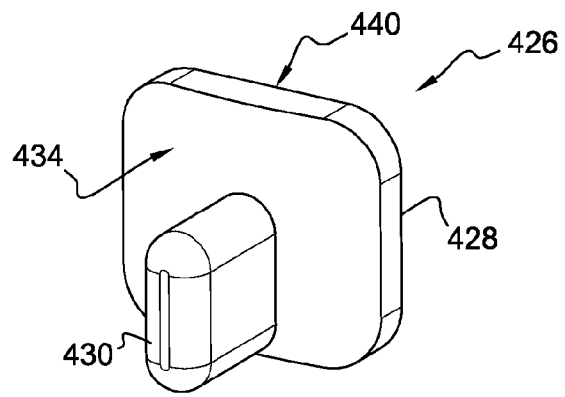

Referring notably to FIG. 22, the shutters 426 are mounted to slide relative to the body in the vertical direction, that is to say parallel to the axis 19. Each shutter 426 comprises a stopper 428 extending inside the head and an operating knob 430 extending outside the head. The stopper 428 in this case has a flattened rectangular parallelepipedal form with rounded corners. The knobs 430 have a form that is flattened in a vertical plane radial to the axis 19.

The head 416 further comprises an internal part 450 in this case formed by a dispenser. It is intended to extend in the head by being in contact with the internal faces of the walls 420, 423 and 425. For this, the dispenser comprises a vertical rectangular planar rear wall 452 intended to be in surface contact with the wall 425 and a cylindrical wall 454 intended to be in surface contact with the internal face of the wall 420. It also comprises a planar top wall 456, the edges of which are contiguous to those of the walls 452 and 454, these three walls forming a chamber that opens downward in line with the wall 456. This bottom opening is pressed against the bottom 423 and thus connects this chamber with the mast 14.

The cylindrical wall 454 has three identical circular orifices 458. When the dispenser 450 occupies its operating position in the head, the orifices 458 coincide with the respective orifices 18.

Furthermore, the wall 454 has, on its external face, three identical rectangular slide rails 460 forming thinned areas of this wall. The slide rails emerge at the bottom edge of the dispenser. The orifices 458 extend to the center of the corresponding slide rails. The width of the slide rails corresponds to that of the stoppers 428. The height of the slide rails is very much greater than that of the stoppers. This way, the respective stoppers can be received in the slide rails by being guided therein to slide vertically relative to the dispenser. Each slide rail is sufficiently deep in the radial direction for the external face 434 of each stopper not to extend beyond the enclosing surface of the external face of the cylindrical wall 454. This mounting is therefore compatible with the surface contact of the walls 454 and 420 apart from the slide rails. The shutters 426 are thus interposed in the direction radial to the axis 19 between the dispenser 450 on the inside and the wall 420 on the outside. Each knob 430 emerges through the oblong extension of each orifice in order to make it possible to control the position of the stopper from the outside of the head. By virtue of this arrangement, the shutters 426 are kept captive in the head.

Figures 17, 18:
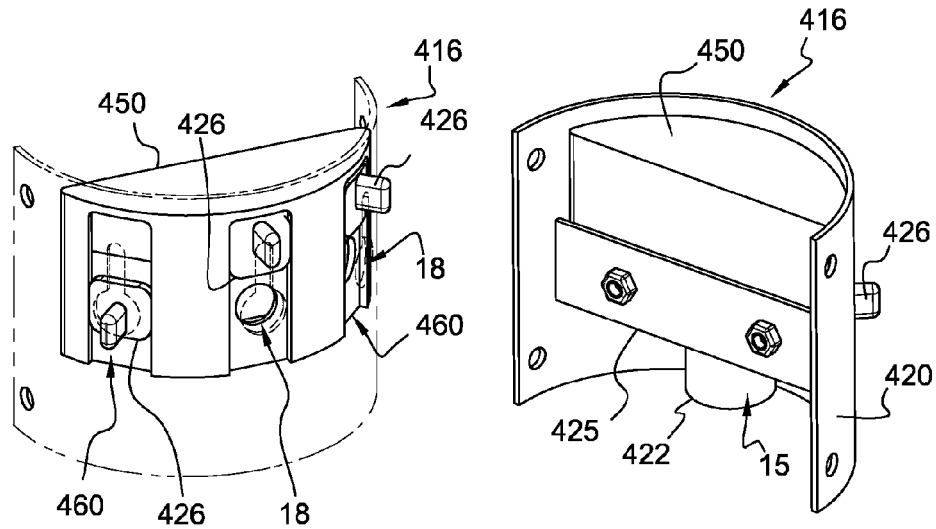
FIGS. 17 and 18 are perspective views of a head according to a fourth embodiment of the invention.
Figure 23:
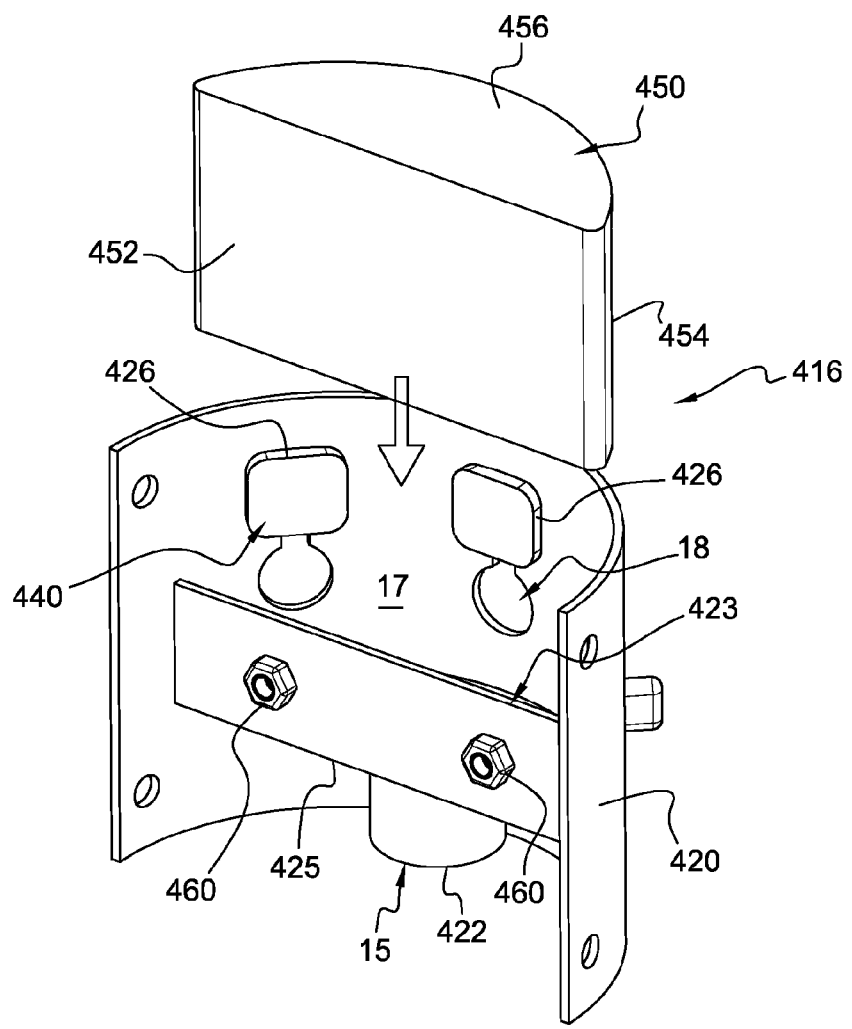
FIG. 23 is a view similar to FIG. 18 showing a step of assembly of the head.

Each shutter 426 can therefore occupy a top position, illustrated notably in FIGS. 17 and 23, in which it leaves the corresponding orifice 18 entirely free. It can also occupy a bottom position, illustrated notably on the left in FIG. 17, in which it completely blocks the corresponding orifice. These two positions form the two ends of the sliding travel of the shutter. The shutter can also be placed in any position between these two ends by being immobilized there by friction in contact with the two parts between which it is interposed.

To facilitate the sliding of each shutter against the dispenser, it is possible to provide for the external face thereof to be covered with a material such as polytetrafluoroethylene.

The head 416 can be assembled as follows with reference to FIG. 23. The first step is to introduce the shutters 426 into the head to place them in the respective orifices 18 and in abutment against the internal face of the wall 420. The dispenser 450 is then inserted into the head through the top thereof until it is placed against the bottom 423. In this position, it connects the mast 14 and the end fitting 422 with the orifices 458, then the orifices 18 when the latter are left free by the shutters. In the present example, two screws 460 pass through the wall 425 and come to bear against the dispenser to immobilize it.

The operation of the head is similar to that of the preceding embodiments.

Of course, numerous modifications can be added to the invention without departing from the framework thereof.

Provision can be made for the magnets to be intended to keep the shutters in the closed position. The magnets can be placed on the shutters and not on the frame of the head.

The installation does not necessarily form a piece of furniture. It can be used in a place of storage or of production, for example a place where wine is made or cheeses are ripened. It can constitute a production and/or packaging installation. The installation can also be used to disinfect or humidify products or volumes, for example products circulating on a belt, notably on a production or packaging line.

The invention claimed is:

1. A mist diffusion head for a nebulizing installation, wherein it exhibits:
   a mist inlet orifice, and
   at least two mist outlet orifices each suitable for connecting the inlet orifice with the outside of the head,
   the head comprising at least two shutters suitable for blocking the respective outlet orifices, each shutter being able to block just one of the outlet orifices, the shutters being mounted to move relative to a frame of the head independently of one another.

2. The head as claimed in claim 1, in which the shutters are mounted to rotate relative to the frame.

3. The head as claimed in claim 1, in which the shutters are mounted to slide relative to the frame.

4. The head as claimed in claim 1, arranged such that each shutter tends by gravity to occupy a predetermined single position out of an orifice blocking position and an orifice opening position.

5. The head as claimed in claim 1, which comprises magnets suitable for retaining the respective shutters in a predetermined position.

6. The head as claimed in claim 1, in which each shutter passes through an orifice of a cover of the head.

7. The head as claimed in claim 1, which comprises two walls defining the orifices, extending one against the other, between which the shutters are interposed and configured to guide the shutters.

8. The head as claimed in claim 1, which comprises an internal dispenser distinct from the frame and suitable for connecting the inlet orifice with the outlet orifices.

9. A droplet mist diffusion installation, which comprises at least one head as claimed in claim 1.

10. A method for diffusing a mist of droplets onto products, wherein at least one head as claimed in claim 1 is used.

\* \* \* \* \*